(12) United States Patent
Ramdohr et al.

(10) Patent No.: US 6,509,523 B2
(45) Date of Patent: Jan. 21, 2003

(54) SWITCHGEAR CABINET

(75) Inventors: Martin Ramdohr, Driedorf (DE); Frank Küster, Medenbach (DE)

(73) Assignee: Rittal GmbH & Co. KG, Herborn (DE)

( * ) Notice: Subject to any disclaimer, the term of this patent is extended or adjusted under 35 U.S.C. 154(b) by 14 days.

(21) Appl. No.: 09/809,721

(22) Filed: Mar. 15, 2001

(65) Prior Publication Data

US 2002/0043388 A1 Apr. 18, 2002

(30) Foreign Application Priority Data

Mar. 15, 2000 (DE) .......................... 100 13 007

(51) Int. Cl.⁷ .............................................. H05K 9/00
(52) U.S. Cl. ............................... 174/35 GC; 174/35 R; 361/800
(58) Field of Search .......................... 174/35 R, 35 GC; 361/800, 816, 818, 605; 312/223.2

(56) References Cited

U.S. PATENT DOCUMENTS 5,894,106 A * 4/1999 Schwenk et al. ............. 174/50
6,291,765 B1 * 9/2001 Kurrer et al. ............. 174/35 R

FOREIGN PATENT DOCUMENTS

DE 40 13 381 7/1991
DE 43 12 833 10/1994

* cited by examiner

Primary Examiner—Hung V. Ngo
(74) Attorney, Agent, or Firm—Pauley Petersen Kinne & Erickson

(57) ABSTRACT

A switchgear cabinet with two profiled frame sections, assigned to one side of the switchgear cabinet, wherein the open side of the switchgear cabinet is partially closed or can be partially closed by at least one wall element. A horizontal cross brace is arranged between the vertical profiled frame sections, against which the wall element rests in an area of one of its horizontal lateral edges. An open transition area in the side of the switchgear cabinet between the cross brace and the cover and/or the bottom area of the switchgear cabinet is covered by a shield. For simplification, the shield is fastened on a fastening section of a holder from the direction of the interior of the switchgear cabinet. With the shield in an unmounted position, the holder is maintained by a locking element in a prepared mounting position.

17 Claims, 2 Drawing Sheets

SWITCHGEAR CABINET

BACKGROUND OF THE INVENTION

1. Field of the Invention

This invention relates to a switchgear cabinet with two profiled frame sections, which are assigned to one side of the switchgear cabinet, wherein the open side of the switchgear cabinet is partially closed or can be partially closed by at least one wall element, and wherein a horizontal cross brace is arranged between the vertical profiled frame sections, against which the wall element rests in the area of one of its horizontal lateral edges.

2. Description of Related Art

A switchgear cabinet is known from German Patent Reference DE 40 13 381 C1. A rack assembled from frame legs is used for this known switchgear cabinet. The rack forms four sides of a switchgear cabinet, which can be covered with vertical wall elements. The front of the switchgear cabinet is covered by several partial wall elements arranged above each other. It is possible for the partial wall elements to be designed as partial doors. In the area of their vertical edges, the partial doors are placed against sealing edges of the vertical profiled frame sections. The horizontal edges of the partial doors are sealed against cross braces extending between the vertical profiled frame sections and are fastened to them. Often the conditions of the built-in devices are such that the wall elements do not completely cover an open side of the switchgear cabinet. An open gap remains in the area of the cover and/or bottom, which is covered by a shield, such as shown in German Patent Reference DE 43 12 833 C2.

SUMMARY OF THE INVENTION

It is one object of this invention to provide a switchgear cabinet of the type mentioned at the outset, wherein the mounting of the shield is simple to perform.

This object is attained with an open transition area in the side of the switchgear cabinet between the cross brace and the cover and/or bottom area of the switchgear cabinet which is covered by a shield. The shield is fastened on a fastening section of a holder from the direction of the interior of the switchgear cabinet. With the shield not mounted, the holder is maintained by a locking element in a prepared mounting position. With this arrangement it is possible to place the shield against the holder from an outside of the switchgear cabinet and then to connect them together. Since the holder is maintained in a prepared mounting position, mounting of the shield can be performed. In particular, mounting can be performed by a single person in this case.

In accordance with a preferred embodiment of this invention, the shield has a fastening bolt facing an interior of the switchgear cabinet. The fastening bolt passes through an opening in the fastening section of the holder and is secured on the back of the fastening section facing the interior of the switchgear cabinet. If the shield is prepositioned in the holders by the bolts, it can be fastened, for example with a nut, which is screwed on the bolt. In another embodiment, the bolt has locking elements which are locked together with the holder. To achieve a dust-proof and moisture-proof closure of the interior of the switchgear cabinet also in the area of the shield, with this invention the shield has a vertical wall which covers the associated open side of the switchgear cabinet. A circumferential edge, including horizontal edges and vertical edges, is beveled off the sides of the wall. A seal, extending at a distance from the edge, is arranged on the inside of the wall, and the seal rests against a sealing edge of the cross brace.

In this case, the switchgear cabinet can be such that the cross brace has a U-shaped cross section formed by two essentially horizontally oriented legs and an inner wall connecting these legs. The leg facing the shield is folded over by 180° at its end facing away from the inner wall for forming the sealing edge. The sealing edge is then formed by a rounded transition area, which does not damage the seal and at the same time forms a defined contact line.

In one embodiment of this invention, after the fastening section, the holder has a transition section with at least one protrusion that has at least one support section. The protrusion is inserted into the fastening receiver of a profiled side arranged on the side toward the switchgear cabinet and extending horizontally. The support section is interlockingly supported at the edge of the fastening receiver. The fastening receivers determine preset fastening positions for the holder. Thus, the holder can be exactly aligned with respect to the fastening points of the shield. Moreover, the interconnected contact created between the support section and the edge of the fastening receiver forms a solid support of the shield without a need for additional screw connections or the like.

Thus, the holder can have beveled contact elements in the area of its protrusion, which are in electrically conducting contact with the profiled side or the cross brace. It is then possible to apply the same electrical potential to the shield as that of the profiled side.

Regarding the design of the holder, a switchgear cabinet in accordance with this invention can be such that a bevel, which extends past the depth of the cross brace into the interior of the switchgear cabinet, is bent off the fastening section of the holder. The bevel has a detent which acts together with a counter-surface of the cross brace and blocks the horizontal displacement of the shield in the direction facing away from the interior of the switchgear cabinet. The detent limits the insertion movement of the shield, so it is easy to install. Moreover, the detent secures the shield mounted on the holder.

It is possible to easily place the locking element on the same electrical level as the holder if the holder has a cutout in which the locking element is held. The locking element is in an electrically conducting connection with the holder through contact teeth. Furthermore, the contact teeth of the locking element also sink in, so that it is securely fastened on the holder. So that the holder is exactly aligned in its presecured mounting position with respect to the cross brace, the locking element has a locking shoulder, which snaps into a cutout of the cross brace.

BRIEF DESCRIPTION OF THE DRAWINGS

This invention is explained in greater detail in the following specification in view of embodiments represented in the drawings, wherein.

DESCRIPTION OF PREFERRED EMBODIMENTS

Figure 1:
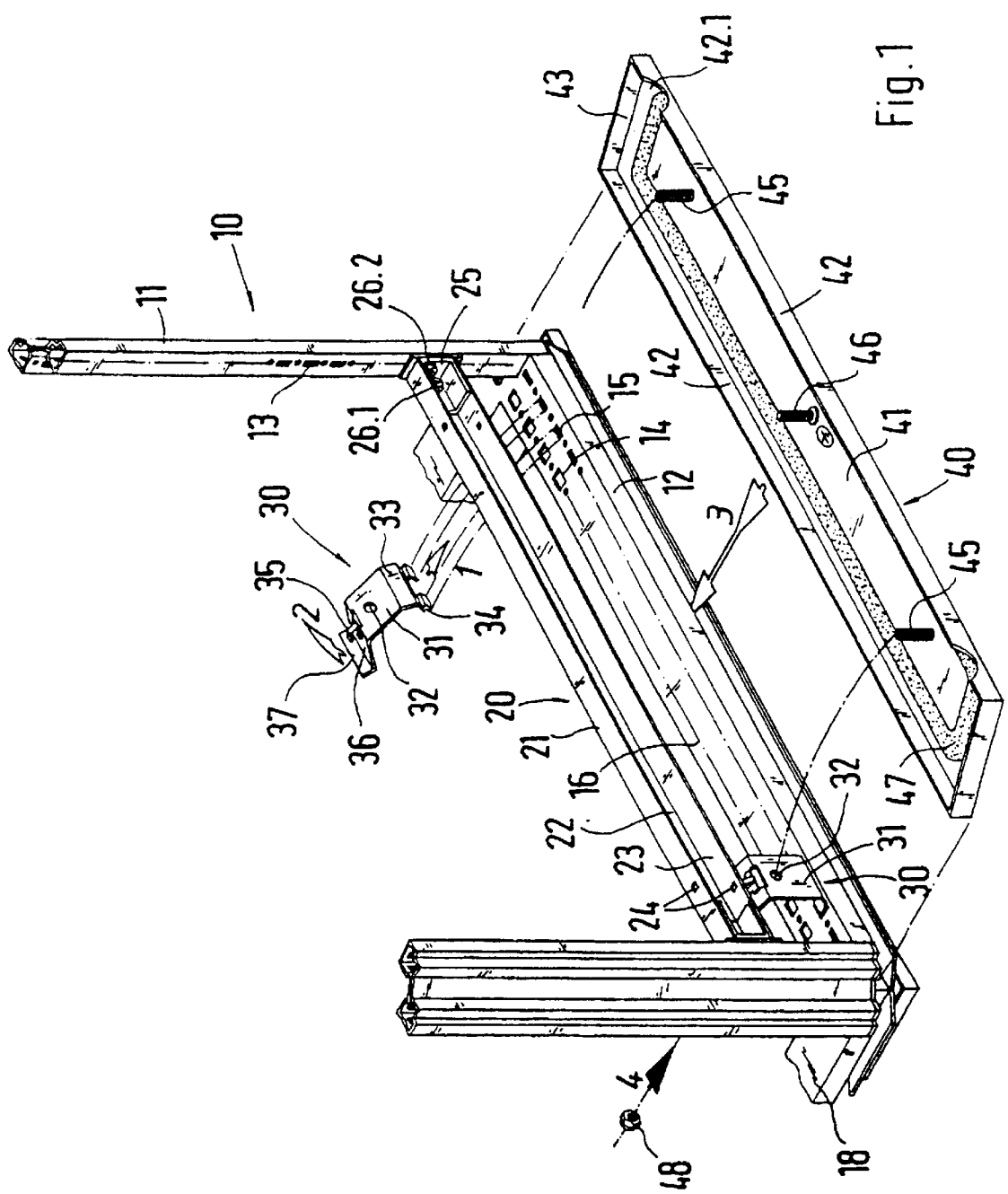
FIG. 1 is a perspective partial view of a rack of a switchgear cabinet with a shield arranged at the bottom.

A rack 10 of a switchgear cabinet is shown in FIG. 1. The rack 10 is assembled from twelve frame legs which are connected with each other in corner areas of the switchgear cabinet. An open front of the switchgear cabinet is bordered by two vertical profiled frame sections 11 and two horizontal profiled frame sections, which are designed as width braces 12. The vertical profiled frame sections 11 have four profiled sides facing the interior of the switchgear cabinet, in each of which a row of fastening receivers 13 are cut. Here, the fastening receivers 13 are spaced apart from each other at even distances.

As shown in FIG. 1, one of the profiled sides of the vertical profiled frame sections 11 extends at right angles with respect to the front of the switchgear cabinet. Thus, the two profiled sides of the vertical profiled frame sections 11 at the front are oriented toward each other. Together with depth braces 18 extending in the direction of the interior of the switchgear cabinet, the width braces 12 form a bottom frame. The depth braces 18 and the width braces 12 are designed with identical cross sections having two profiled sides facing the interior of the switchgear cabinet which meet at right angles and form an inner edge. Each one of the profiled sides has two rows of fastening receivers 14 and 15. Here, the rows of fastening receivers 15 transition into the rows of fastening receivers 13 of the vertical profiled frame sections 11.

A cross brace 20 is placed between the two vertical profiled frame sections 11. Angled mounting elements 25 are screwed, such as with fastening screw 26.1, into the area of the longitudinal ends of the cross brace 20. The angled mounting elements 25 have a mounting plate, with which they are placed against the vertical profiled frame sections 11. The angled mounting element 25 can be fastened to the vertical profiled frame section 11 by means of fastening screws 26.2, which pass through a fastening receiver of the mounting plate and screwed into an associated fastening receiver 13.

Figure 2:
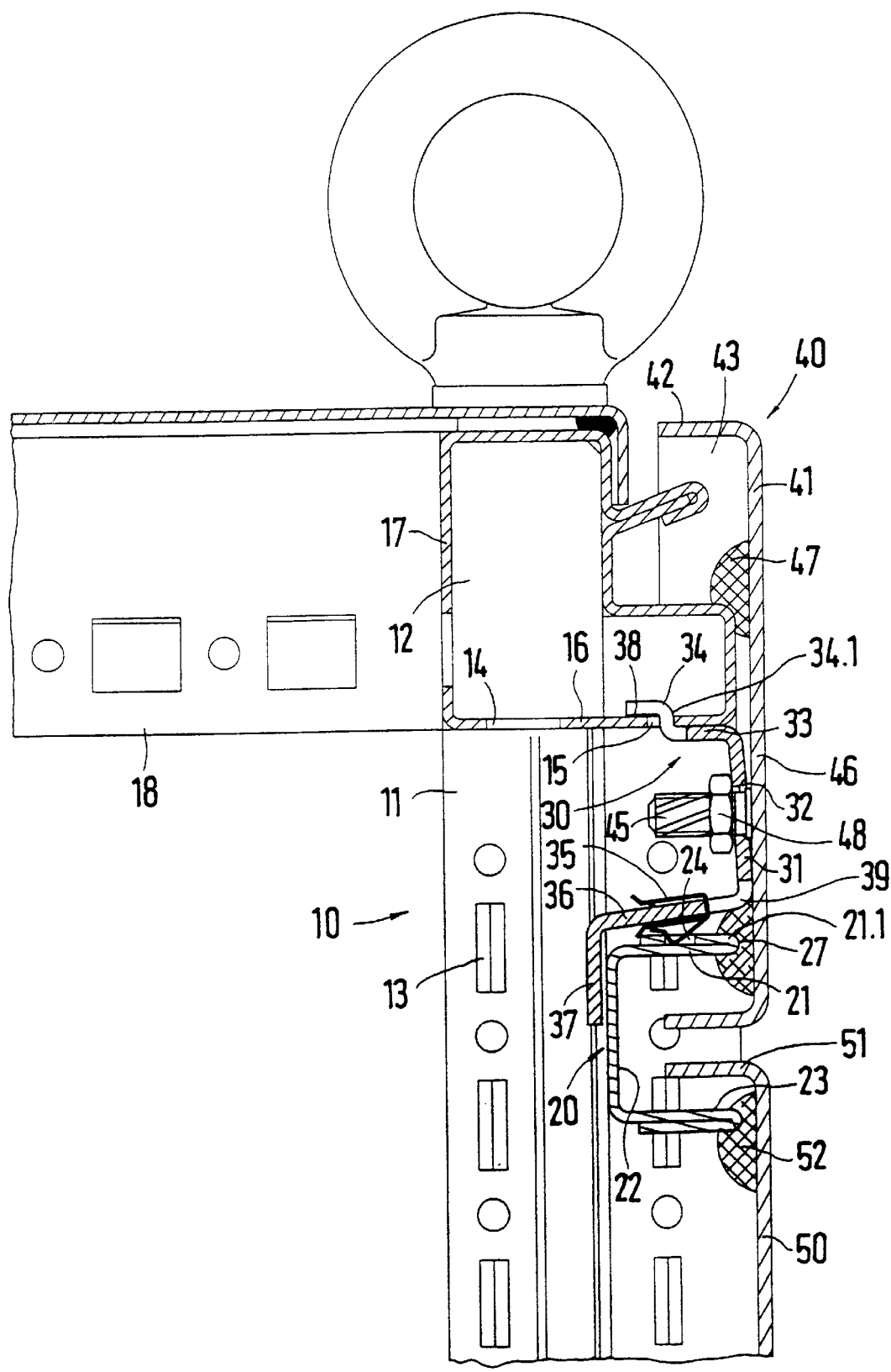
FIG. 2 is a side sectional view of the rack shown in FIG. 1, with a shield mounted in the cover area.

The cross-sectional embodiment of the cross brace 20 can be clearly seen in FIG. 2. As FIG. 2 shows, the cross brace 20 has a U-shaped cross section. This is formed by two legs 21, 23, which are parallel with each other and are connected with each other by a vertically extending inner wall 22. On their free ends, the legs 21, 23 are bent by 180°, so that a fold 21.1 is created. A rounded sealing edge 27 is formed in the transition area between the fold 21.1 and the respective leg 21, 23. An opening, which forms a cutout 24, is punched out of the fold 21.1.

As FIG. 1 further shows, a holder 30 can be fastened on the rack 10. The holder 30 has a fastening section 31, in which a cutout 32 is made. A transition section 33 is bent off the fastening section 31. The transition section 33 has two protrusions 34, which are arranged spaced apart from each other. On the side facing away from the transition section 33, the fastening section 31 has a bevel 36. The bevel 36 terminates in an angled detent 37. The design of the cross section of the holder 30 is shown in greater detail in FIG. 2.

As FIG. 2 shows, the protrusions 34 are bent off in an S-shape from the transition section 33, so that a support section 34.1 is created. The holder 30 has a cutout 39 in the transition area between the fastening section 31 and the bevel 36. A locking element 35 can be placed into the cutout 39. The locking element 35 is designed as a U-shaped clip, which extends around the bevel 36 with both of its clamping legs. The locking element 35 has contact teeth near at least one of its legs for achieving a better hold. The contacting teeth sink into the surface of the bevel 36. With this engagement, an electrically conducting contact is also created between the locking element 35 and the holder 30. The locking element 35 can be easily installed, because the cutout 39 is positioned in the transition area between the fastening section 31 and the bevel 36.

FIG. 1 shows a shield 40, which can be installed on the rack. The shield 40 has a wall 41, from which a circumferential edge is bent away. In this case, the edge is formed by horizontal and vertical edge sections 42, 43. A seal 47 is formed on the wall 41 a distance away from the edge sections 42, 43. Three fastening bolts 45, here designed as threaded bolts, are welded to the inside of the wall 41.

As FIG. 1 shows, the holders 30 can be inserted with their protrusions 34 into the fastening receivers 15 of the width brace 12. During insertion of the protrusions 34, the fastening section is tilted. Once the protrusions 34 are inserted into the fastening receivers 15, the holder 30 can be pivoted up, as shown in mounted position 2. While pivoting the holder 30 up, an elastic spring element of the locking element 35 is stretched with respect to the cross brace. As soon as the holder 30 achieves an upright mounting position, the spring element snaps into the cutout 24 of the cross brace 20. The holder 30 is then fixed in place in a prelocked mounting position. In this mounting position, the opening 32 is aligned with the two fastening bolts 45. Thus, the shield 40 can be placed against the rack 10, wherein the fastening bolts 45 extend through the openings 32. As shown in FIG. 2, nuts 48 can be screwed on the fastening bolts 45, so that the shield 40 is fixed in place.

As FIG. 2 also shows, the holder rests interlockingly with its support section 34 against the edge of the fastening receiver 15 of the width brace 12. This prevents the shield 40 from being pulled off the rack 10 toward the front. Displacement of the shield 40 toward the interior of the switchgear cabinet is blocked by the circumferential seal 47. The area of the horizontal edges of the latter rests against a sealing face of the width brace 12 and the sealing edge 27 of the cross brace 20. The vertical sections of the seal 47 are placed against sealing faces of the vertical profiled frame sections 11. As FIG. 1 shows, the horizontal edge section 42 of the shield 40 facing the center of the open side of the switchgear cabinet has a cutout 42.1 that bridges the sealing edges of the vertical profiled frame section 11. The shield 40 has a ground connector 48 between the two fastening bolts 45. The ground connector 48 is welded together with the shield 40.

As FIG. 2 shows, the portion of the open side of the switchgear cabinet which is not covered by the shield 40 can be closed off by means of one or several wall elements 50 which are arranged above each other. The wall elements 50 have a rounded lateral edge 51. A circumferential seal 52 is formed on the inside of the wall element 50 at a distance from lateral edge 51. The seal 52 rests against the sealing edge 27 of the lower leg 23 of the cross brace 20.

What is claimed is:

1. In a switchgear cabinet having two profiled frame sections assigned to an open side of the switchgear cabinet, the open side of the switchgear cabinet being partially closed by at least one wall element, wherein a horizontal cross brace is arranged between the vertical profiled frame sections, against which the wall element rests near one of a plurality of horizontal lateral edges of the wall element, the improvement comprising:

an open transition area in the side of the switchgear cabinet between the cross brace (20) and at least one of a cover and a bottom area of the switchgear cabinet covered by a shield (40), the shield (40) fastened on a fastening section (31) of a holder (30) from a direction of an interior of the switchgear cabinet, and with the shield (40) in an unmounted position the holder (30) maintained by a locking element (35) in a prepared mounting position, the holder (30) having a cutout (39) in which the locking element (35) is held, and the locking element (35) in an electrically conducting connection with the holder (30) by a plurality of contact teeth.

2. In a switchgear cabinet having two profiled frame sections assigned to an open side of the switchgear cabinet, the open side of the switchgear cabinet being partially closed by at least one wall element, wherein a horizontal cross brace is arranged between the vertical profiled frame sections, against which the wall element rests near one of a plurality of horizontal lateral edges of the wall element, the improvement comprising:

an open transition area in the side of the switchgear cabinet between the cross brace (20) and at least one of a cover and a bottom area of the switchgear cabinet covered by a shield (40), the shield (40) fastened on a fastening section (31) of a holder (30) from a direction of an interior of the switchgear cabinet, and with the shield (40) in an unmounted position the holder (30) maintained by a locking element (35) in a prepared mounting position, the holder (30) having beveled contact elements (38) near a protrusion (34) which are in an electrically conducting contact with one of a profiled side (16) and the cross brace (20).

3. In the switchgear cabinet in accordance with claim 2, wherein the shield (40) has a vertical wall (41) which covers the open side of the switchgear cabinet, a circumferential edge is beveled off the sides of the wall (41), a seal extending at a distance from the circumferential edge is arranged on an inside of the wall (41), and the seal (47) rests against a sealing edge (27) of the cross brace (20).

4. In the switchgear cabinet in accordance with claim 3, wherein the cross brace (20) has a U-shaped cross section formed by two essentially horizontally oriented legs (21, 23) and an inner wall (22) connecting the legs (21, 23), and the leg (21) facing the shield (40) is folded over by 1800 at an end of the leg (21) facing away from the inner wall (22) for forming the sealing edge (27).

5. In the switchgear cabinet in accordance with claim 4, wherein following the fastening section (31) the holder (30) has a transition section (33), the transition section (33) has at least one protrusion (34) with at least one support section (34.1), the protrusion (34) is inserted into a fastening receiver (15) of a profiled side (16) arranged on the side toward the switchgear cabinet and extending horizontally, and the at least one support section (34.1) is interlockingly supported at the edge of the fastening receiver (15).

6. In the switchgear cabinet in accordance with claim 5, wherein the holder (30) has beveled contact elements (38) near a protrusion (34) which are in an electrically conducting contact with one of the profiled side (16) and the cross brace (20).

7. In the switchgear cabinet in accordance with claim 6, wherein a bevel (36) which extends beyond a depth of the cross brace (20) into the interior of the switchgear cabinet is bent off the fastening section (31) of the holder (30), and the bevel (36) has a detent (37) which acts with a counter-surface of the cross brace (20) and blocks a horizontal displacement of the shield (40) in a direction facing away from the interior of the switchgear cabinet.

8. The switchgear cabinet in accordance with claim 7, wherein the locking element (35) has a locking shoulder which snaps into a cutout (24) of the cross brace (20).

9. The switchgear cabinet in accordance with claim 8, wherein the holder (30) is produced as a punched and stamped element from a sheet steel blank.

10. In a switchgear cabinet having two profiled frame sections assigned to an open side of the switchgear cabinet, the open side of the switchgear cabinet being partially closed by at least one wall element, wherein a horizontal cross brace is arranged between the vertical profiled frame sections, against which the wall element rests near one of a plurality of horizontal lateral edges of the wall element, the improvement comprising:

an open transition area in the side of the switchgear cabinet between the cross brace (20) and at least one of a cover and a bottom area of the switchgear cabinet covered by a shield (40), the shield (40) fastened on a fastening section (31) of a holder (30) from a direction of an interior of the switchgear cabinet, and with the shield (40) in an unmounted position the holder (30) maintained by a locking element (35) in a prepared mounting position, following the fastening section (31) the holder (30) having a transition section (33), the transition section (33) having at least one protrusion (34) with at least one support section (34.1), the protrusion (34) inserted into a fastening receiver (15) of a profiled side (16) arranged on the side toward the switchgear cabinet and extending horizontally, and the at least one support section (34.1) interlockingly supported at the edge of the fastening receiver (15).

11. In the switchgear cabinet in accordance with claim 10, wherein the shield (40) has a vertical wall (41) which covers the open side of the switchgear cabinet, a circumferential edge is beveled off the sides of the wall (41), a seal extending at a distance from the circumferential edge is arranged on an inside of the wall (41), and the seal (47) rests against a sealing edge (27) of the cross brace (20).

12. In a switchgear cabinet having two profiled frame sections assigned to an open side of the switchgear cabinet, the open side of the switchgear cabinet being partially closed by at least one wall element, wherein a horizontal cross brace is arranged between the vertical profiled frame sections, against which the wall element rests near one of a plurality of horizontal lateral edges of the wall element, the improvement comprising:

an open transition area in the side of the switchgear cabinet between the cross brace (20) and at least one of a cover and a bottom area of the switchgear cabinet covered by a shield (40), the shield (40) fastened on a fastening section (31) of a holder (30) from a direction of an interior of the switchgear cabinet, with the shield (40) in an unmounted position the holder (30) maintained by a locking element (35) in a prepared mounting position, and the shield (40) having a vertical wall (41) covering the open side of the switchgear cabinet, a circumferential edge beveled off the sides of the wall (41), a seal extending at a distance from the circumferential edge and arranged on an inside of the wall (41), the seal (47) resting against a sealing edge (27) of the cross brace (20), the cross brace (20) having a U-shaped cross section formed by two essentially horizontally oriented legs (21, 23) and an inner wall (22) connecting the legs (21, 23), and the leg (21) facing the shield (40) folded over by 180° at an end of the leg (21) facing away from the inner wall (22) for forming the sealing edge (27).

13. In the switchgear cabinet in accordance with claim 12, wherein the shield (40) has a fastening bolt (45) facing the interior of the switchgear cabinet, the fastening bolt (45) passes through an opening (32) in the fastening section (31) of the holder (30) and is secured on a back of the fastening section (31) facing the interior of the switchgear cabinet.

14. In the switchgear cabinet in accordance with claim 12, wherein the holder (30) is produced as a punched and stamped element from a sheet steel blank.

15. In a switchgear cabinet having two profiled frame sections assigned to an open side of the switchgear cabinet, the open side of the switchgear cabinet being partially closed by at least one wall element, wherein a horizontal cross brace is arranged between the vertical profiled frame sections, against which the wall element rests near one of a plurality of horizontal lateral edges of the wall element, the improvement comprising:

- an open transition area in the side of the switchgear cabinet between the cross brace (20) and at least one of a cover and a bottom area of the switchgear cabinet covered by a shield (40),
- the shield (40) fastened on a fastening section (31) of a holder (30) from a direction of an interior of the switchgear cabinet, and
- with the shield (40) in an unmounted position the holder (30) maintained by a locking element (35) in a prepared mounting position, a bevel (36) extending beyond a depth of the cross brace (20) into the interior of the switchgear cabinet being bent off the fastening section (31) of the holder (30), and the bevel (36) having a detent (37) which acts with a counter-surface of the cross brace (20) and blocks a horizontal displacement of the shield (40) in a direction facing away from the interior of the switchgear cabinet.

16. In the switchgear cabinet in accordance with claim 15, wherein the holder (30) has a cutout (39) in which the locking element (35) is held, and the locking element (35) is in an electrically conducting connection with the holder (30) by a plurality of contact teeth.

17. In a switchgear cabinet having two profiled frame sections assigned to an open side of the switchgear cabinet, the open side of the switchgear cabinet-being partially closed by at least one wall element, wherein a horizontal cross brace is arranged between the vertical profiled frame sections, against which the wall element rests near one of a plurality of horizontal lateral edges of the wall element, the improvement comprising:

- an open transitional area in the side of the switchgear cabinet between the cross brace (20) and at least one of a cover and a bottom area of the switchgear cabinet covered by a shield (40),
- the shield (40) fastened on a fastening section (31) of a holder (30) from a direction of an interior of the switchgear cabinet, and
- with the shield (40) in an unmounted position the holder (30) maintained by a locking element (35) in a prepared mounting position, the locking element (35) having a locking shoulder which snaps into a cutout (24) of the cross brace (20).

* * * * *